United States Patent [19]

Gleize

[11] 4,317,501
[45] Mar. 2, 1982

[54] APPARATUS FOR THE PRODUCTION OF SEISMIC SHOCKS

[75] Inventor: Jacques Gleize, Paris, France

[73] Assignee: Compagnine Generale de Geophysique, Massy, France

[21] Appl. No.: 181,483

[22] Filed: Aug. 26, 1980

Related U.S. Application Data

[62] Division of Ser. No. 849,022, Nov. 7, 1977.

[30] Foreign Application Priority Data

Nov. 5, 1976 [FR] France .............................. 76 33455

[51] Int. Cl.³ ............................................ G01V 1/147
[52] U.S. Cl. .................................. 181/121; 181/114; 181/401; 150/1
[58] Field of Search ............... 181/121, 113, 114, 401; 150/1; 206/540

[56] References Cited

U.S. PATENT DOCUMENTS

| | | | |
|---|---|---|---|
| 3,109,473 | 11/1963 | Nourse et al. | 150/1 |
| 3,117,606 | 1/1964 | Hastings | 150/1 |
| 3,130,809 | 4/1964 | Flatow | 181/121 |
| 3,542,151 | 11/1970 | Hamilton | 181/121 |
| 3,583,521 | 6/1971 | Anstey | 181/114 |
| 4,124,090 | 11/1978 | Reynolds et al. | 181/121 |

Primary Examiner—Howard A. Birmiel
Attorney, Agent, or Firm—Schwartz, Jeffery, Schwaab, Mack, Blumenthal & Koch

[57] ABSTRACT

A releasable heavy mass is provided which is capable of producing by impact with the ground a shock which can be used in seismic prospecting.

This mass is characterized by the fact that it comprises very many individual heavy elements connected together in a way loose enough to allow deformation of the mass without loss of cohesion on impact, and in that its base is of considerable area relative to the surface of the whole mass and is maintained substantially plane at least after release and up to impact. The mass is, in seismic prospecting, released from a helicopter.

9 Claims, 6 Drawing Figures

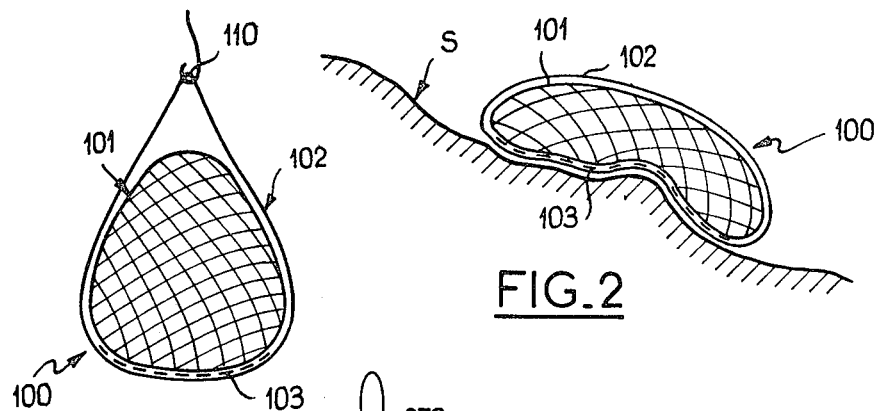
FIG. 1
FIG. 2
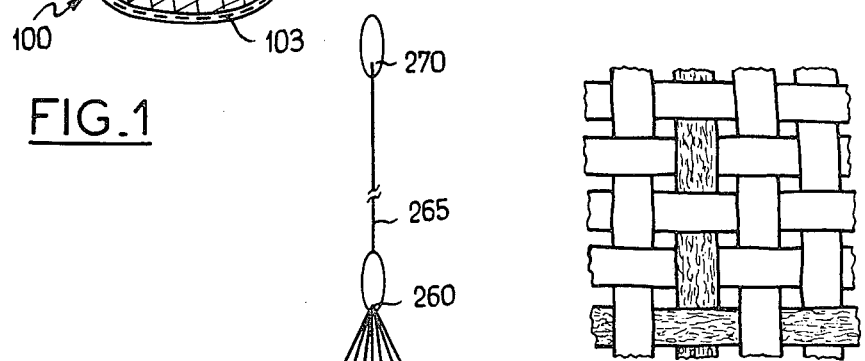
FIG. 3
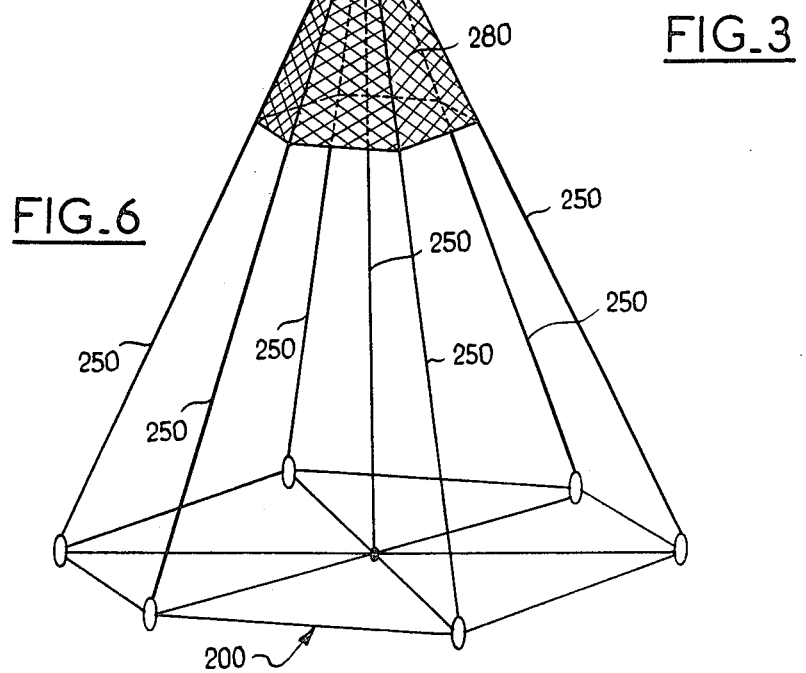
FIG. 6

APPARATUS FOR THE PRODUCTION OF SEISMIC SHOCKS

PRIOR APPLICATION DATA

This application is a divisional of U.S. patent application Ser. No. 849,022, filed Nov. 7, 1977.

BACKGROUND OF THE INVENTION

The present invention concerns the generating of shocks in the ground for seismic exploration, and in particular concerns the production of shocks by the dropping of a weight on to the ground.

The weight dropping method has been known for a long time and is particularly described in the U.S. Pat. No. 2,851,121. In this known method a lorry fitted with a lifting jib is used to raise a heavy solid body to a certain height which is then allowed to fall on to the ground. In current practice, for example, a heavy mass of three tons is dropped from a height of three meters. Usually the energy released in the ground by the shock produced by the impact of the heavy mass is relatively low, and so it is advantageous to use a succession of such shocks giving rise to different, refracted or reflected waves which return through the ground to seismic detectors, and to integrate the different signals corresponding to different shocks to obtain a composite signal containing significant data.

The method of prospecting by weight dropping, described above, offers the essential advantage of being able to be carried out near houses (which is not the case with methods involving the exploding of charges); it is not in itself very effective from the seismic point of view, in the sense that it only introduces low amounts of energy into the ground; in any case, it requires the use of a heavy land vehicle, which precludes its use in hilly areas.

It is an object of the present invention to provide a new mode of seismic prospecting by weight dropping particularly involving a new heavy mass.

Another object of the present invention consists in the replacing of the land vehicle previously used by an aircraft, particularly a balloon or a helicopter. Helicopters are known to be more and more used in seismic expeditions. A priori, the use of aircraft allows the release of a heavy mass from a height much greater than usual heights and the potential energy of the heavy mass, which varies with the height of the drop, can be especially increased thereby, all things staying equal in other respects. For example, it seems advantageous, from the energy point of view, to work with a mass of 500 kgs for dropping heights comprised between 5 and 100 meters.

In a complementary way, the increase in the dropping height increasing the speed of arrival on the ground results in an appreciable enlargement of the spectrum of the seismic wave produced, which improves the seismic data obtained.

The first trials conducted by applicants consisted purely and simply in transposing the conventional technique to the release-by-aircraft situation, using a hovering helicopter equipped for transporting by sling and fitted with a system of electromagnetic release controlled by the pilot. Heavy masses, solid and rigid, of various shapes were released thus from various heights.

The results obtained proved nearly unusable for all of the following reasons:

on hard terrain and even on relatively loose terrain, the mass rebounds on its first impact with the ground and gives rise to a series of successive shocks in a random and unpredictable way; for that reason, the reflected or refracted seismic waves are not exploitable in practice: they contain parasite waves.

on very loose terrain, the mass buries itself in the ground, and there is a barely usable shock wave, and a significant deterioration in the surface of the ground.

Thus, it is apparent that the method putting into practice a weight drop from an aircraft cannot be a simple transposition of known weight dropping methods.

Essentially, for a seismic prospecting by aircraft, the applicants propose a new releasable heavy mass characterised by its structure and by its functions.

SUMMARY OF THE INVENTION

The releasable heavy mass according to the invention is essentially characterised in that its comprises very many individual heavy units connected together in a way sufficiently loose to allow the deformation of the mass without the assembly, however, losing its unity on impact. Furthermore, the mass comprises, according to the invention, means for ensuring and maintaining the inherent flatness of the area of the movable mass coming into contact with the ground. A seismic prospecting method using this mass involves releasing the mass from an aircraft which preferably is a helicopter.

In a first embodiment, the individual heavy elements can be formed by pieces of large metal shot connected by a special casing. In a second embodiment, preferred at the moment, taking into account realised experimental tests, the individual elements are formed by links connected together to form segments of chain disposed in the form of a star or in the form of a cobweb pattern, by elastically deformable, jointed structures.

The specification which follows with reference to the attached drawings will make the invention clearer, while making evident all its advantages and characteristics with reference to preferred embodiments.

BRIEF DESCRIPTION OF THE DRAWINGS

FIG. 1 represents diagrammatically a heavy mass according to the invention in position about to be released, FIG. 2 represents this same mass at the time of impact with the ground, FIG. 3 represents diagrammatically a casing of this mass, FIG. 6 shows a way of suspending the cobweb of chains.

DETAILED DESCRIPTION OF THE PREFERRED EMBODIMENTS

Figure 4:
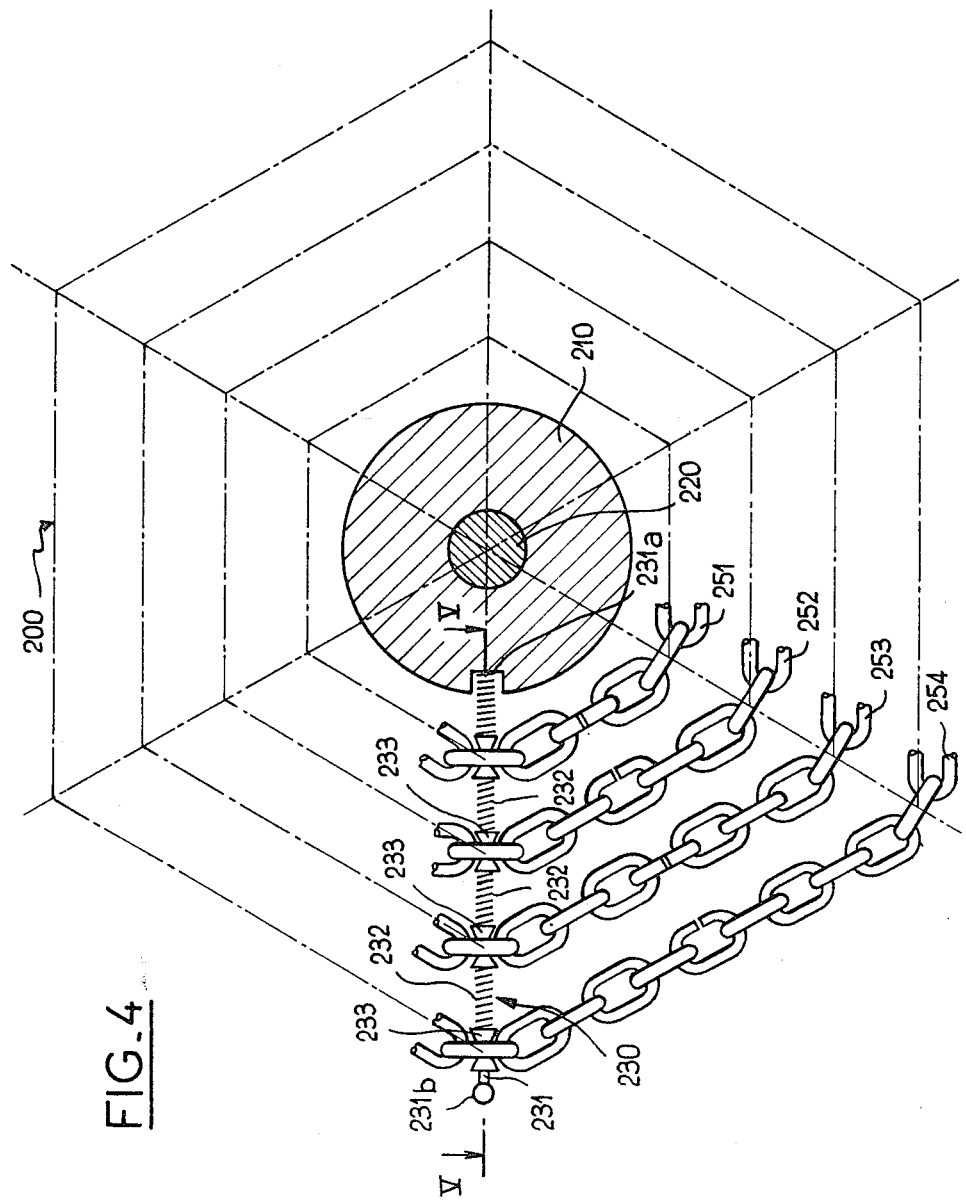
FIG. 4 represents diagrammatically the cobweb of chains forming the preferred embodiment.

First the embodiment in FIGS. 1, 2 and 3 will be described. A heavy mass 100 is formed of metal shot, particularly of iron shot, enclosed in several casings 101, 102 . . . . The individual elements of shot have, for example, a diameter of 0.5 to 3 cm. The exterior casings 101, 102 . . . must be both resistant and flexible. An alternation of resistant and flexible casings can be used. The resistant casings are advantageously formed by a metal trellis made of cables or of metal strands; preferably, metal strands made from thin flexible strips, as represented in FIG. 3, are used. The flexible casings are advantageously made of rubberized fabric. As a variant, a superposition of metal nets or trellis can be used. A single casing of rubber strengthened with wire can also give satisfaction.

In the suspended state shown in FIG. 1, the mass 100 takes, as represented, the shape of a pear. At the base of this pear, a plane framework 103 is placed, rigid enough to inherently give the base at least approximate flatness, as shown. The centre of gravity of the suspended mass is nearer the base 103 than the suspension point 110.

FIG. 2 shows impact of the mass 100 on a relatively hilly piece of ground S. The flexibility of the mass allows it to be deformed on impact to assume the shape of the ground S and to absorb, if not to suppress completely, the rebound effect. Moreover, the width of the base 103 substantially avoids penetration by the mass when it falls on to very soft ground. Finally, the inherent flatness of the base 103 ensures, at the time of an impact on relatively flat ground, the brevity of the impact, all points of the base, in practice, coming into contact with the soil together.

Of course, the suspension and release apparatuses for the mass 100 comprise means known in themselves and suitable for seismic application and thus require no further description. For detecting arrival on the ground in particular, the mass of shot incorporates a shock detector, for example of the known type in which the shock closes an electric contact; such a detector is advantageously connected by an electric cable to the release helicopter, this electric cable being, before release, wound on a roller with an automatic resilient return.

Figure 5:
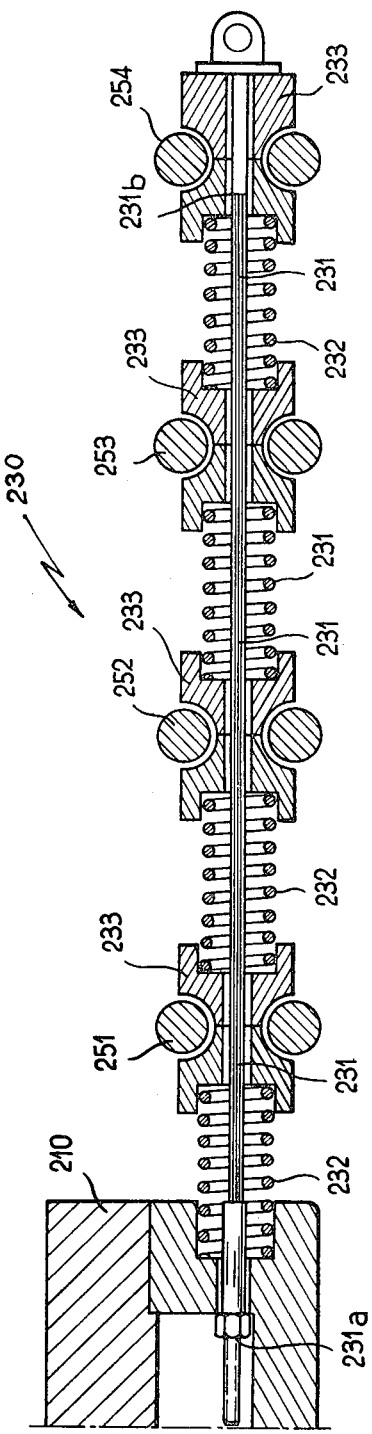
FIG. 5 is a section along the section line V—V of FIG. 4.

FIGS. 4 and 5 illustrate the most preferred embodiment of the invention. The mass 200 according to this preferred embodiment comprises a central metal disc 210 on which is mounted, as before, a shock detector or accelerometer 220. Around the central axis of the disc 210 extend six radial arms 230. As can be better seen in FIG. 5, each arm 230 is formed by an element of metal cable 231 fixed at one end 231a to the disc 210 and held at its other end 231b by a keeper or holding element. On each arm 230 are threaded successively a series of springs 232 and hollow metal braces 233, each brace having, as seen in the drawings, the shape of a spool. The springs 232 are put under compression and all the elements of each arm are thus maintained in radial tension under the effect of the springs. Each arm 230 thus forms a joined assembly which is deformable but which always returns to the straight position.

Chains 251, 252, 253, 254, are mounted in a structure of concentric hexagons at different distances from the central disc 210. To do this, the angle links of the chains span the different braces. Thus a flexible structure is finally obtained, with elements of individual links extending substantially in a plane according to a network of chains and deformable arms, in the form of a cobweb. In a typical example, the central disc can have a weight of the order of 100 kg for a chain weight of 350 kg and a total weight of the order of 500 kg.

It is moreover advantageous to provide an interchangeable central disc 210 in order to be able to adapt the releasable mass 210 to different conditions of use by slight variations of the distribution of the masses.

It is easily seen that the releasable mass 200 possesses, to a greater degree even than the mass 100, the properties which have appeared from experiment to be necessary for a weight drop carried out from a great height which is to be usable seismically, namely, the properties of flexibility, large base surface and inherent flatness.

Of course, other geometric arrangements than the hexagon can be realised and are included in the invention. Numerous networks of chains can be placed in a symmetrical fashion around a disc or a central weight, with resilient means tending to maintain the inherent flatness of the structure in a polygonal or circular arrangement.

For such plane structures of chains, particular precautions must be taken for suspension and release, and FIG. 6 shows a preferred mode of suspension for the mass 200 which is represented schematically by outlines. Six suspension slings 250 hold the mass 200 at the angles of its external periphery and one at its centre; these seven slings are joined at 260, another sling 264 joining their connection point 260 to the point of suspension 270 from a helicopter. It must be noted that in this suspension condition, the mass is slightly deformed, its concavity being turned upwards. On release, the springs 232 bring the mass 200 back to inherent flatness.

Again, after release, the mass must fall without the slings 250 coming between the mass and the ground. To do this, the slings are fitted with brace-sails 280 made, for example, of fabric, which are capable of creating a drag (parachute effect) to keep the point 260 absolutely above the mass 200. In all cases where it is desired that the mass 200 keep rigorously horizontal, the brace-sails 280 can also be given a size sufficient for the parachute effect to brake the drop of the mass slightly while keeping the latter horizontal.

Thus the deformable mass according to the invention enables the production of seismic shocks by weight dropping from aircraft with considerable drop heights and particularly drop heights of between 5 and 100 meters, the shock waves obtained being most often more exploitable and richer in data than those conventionally obtained.

In a simplified variant of the apparatus of FIGS. 4 and 5, the radial arms, anchored in the central disc 210, are cables exhibiting a rigidity sufficient to ensure, once the mass has been released, to restoration of the mat of chains to the plane condition. On each arm are threaded successively a series of braces whose role is to maintain the distance between the concentric hexagons of the chain.

In another variant of embodiment, the jointed arms are formed by cables on which are threaded successively cylinders of rubber or similar compressible material and round links forming part of chain elements, such as 251, 252, 253, 254.

Such cylinders of rubber are kept under compression and play the same role as the springs 232, in such a way that each elastically deformable arm is maintained in a state of radial tension while extended.

I claim:
1. A releasable heavy mass comprising:
   a multiplicity of chain links arranged to form a plurality of chains;
   a central mass surrounded by said chains;
   a plurality of elastically deformable arms extending out from said central mass and supporting said chains, each arm comprising a central cable engaged with individual chain links in said chains;
   a plurality of elastically deformable means on said arms arranged to be maintained under compression between said links engaged with said cables whereby said deformable means tend to restore said arms to a condition of radial extension;

releasable sling means attached to said arms and said mass; and aerodynamic drag means mounted to said sling means and arranged to maintain said sling means above said central mass during falling of the releasable heavy mass.

2. A releasable heavy mass capable of being released from an aircraft from a height of between about 5 and 100 meters and of producing by impact with the ground a shock exploitable in seismic prospecting, said mass comprising:

a multiplicity of individual heavy elements connected together in a way loose enough to allow deformation of the mass without loss of cohesion on impact, the mass having a lower portion comprising a base portion; and base stiffening means for stiffening said base portion of the mass and biasing at least the lower of said elements towards a substantially horizontal base plane at least after said release and up to said impact, wherein said individual elements are links of chain, said mass comprising a central weight surrounded by several elastically deformable, jointed arms, said arms serving as base stiffening means for several rows of said chain links in a plane structure arranged in the pattern of a cobweb.

3. A releasable heavy mass as claimed in claim 2, wherein the central disc carries shock detector means.

4. A releasable mass as claimed in claim 2, wherein each arm comprises a central cable on which are successively threaded chain links connected to the said rows of chain links and elastically deformable elements serving as complementary base stiffening means kept under compression always tending to bring the arm into a position of radial extension.

5. A releasable heavy mass as claimed in claim 2, further comprising a sling assembly fitted with brace-sails to produce an effect of aerodynamic drag.

6. A releasable heavy mass capable of being released from an aircraft from a height of between about 5 and 100 meters and of producing by impact with the ground a shock exploitable in seismic prospecting, said mass comprising:

a multiplicity of individual heavy elements connected together in a way loose enough to allow deformation of the mass without loss of cohesion on impact; and base stiffening means for biasing at least the lower of said individual heavy elements towards a substantially horizontal base plane at least after said release and up to said impact, wherein said individual heavy elements are links of chain, said mass comprising a central weight surrounded by several elastically deformable, jointed arms, said arms serving as base stiffening means for several rows of said chain links in a plane structure arranged in the pattern of a cobweb.

7. A releasable heavy mass as claimed in claim 6, wherein the central disc carries shock detector means.

8. A releasable mass as claimed in claim 6, wherein each arm comprises a central cable on which are successively threaded chain links connected to the said rows of chain links and elastically deformable elements serving as complementary base stiffening means kept under compression always tending to bring the arm into a position of radial extension.

9. A releasable heavy mass as claimed in claim 6, further comprising a sling assembly fitted with brace-sails to produce an effect of aerodynamic drag.

* * * * *